US011183312B2

(12) United States Patent
Stewart et al.

(10) Patent No.: US 11,183,312 B2
(45) Date of Patent: Nov. 23, 2021

(54) PROCESS FOR TREATING FLUID WASTES

(71) Applicant: GeoRoc International, Inc., Chevy Chase, MD (US)

(72) Inventors: Martin William Alexander Stewart, New South Wales (GB); Paul Heath, Sheffield (GB); Salvatore Moricca, New South Wales (AU)

(73) Assignee: GEOROC INTERNATIONAL, INC., Chevy Chase, MD (US)

( * ) Notice: Subject to any disclaimer, the term of this patent is extended or adjusted under 35 U.S.C. 154(b) by 122 days.

(21) Appl. No.: 15/863,406

(22) Filed: Jan. 5, 2018

(65) Prior Publication Data

US 2018/0197647 A1 Jul. 12, 2018

Related U.S. Application Data

(60) Provisional application No. 62/443,297, filed on Jan. 6, 2017.

(51) Int. Cl.
| | | |
|---|---|---|
| *G21F 9/16* | (2006.01) | |
| *B01J 39/14* | (2006.01) | |
| *B01J 39/02* | (2006.01) | |
| *G21F 9/12* | (2006.01) | |
| *G21F 9/30* | (2006.01) | |

(52) U.S. Cl.
CPC .............. *G21F 9/162* (2013.01); *B01J 39/02* (2013.01); *B01J 39/14* (2013.01); *G21F 9/12* (2013.01); *G21F 9/16* (2013.01); *G21F 9/305* (2013.01)

(58) Field of Classification Search
CPC .... G21F 9/16; G21F 9/162; G21F 9/12; B01J 39/02; B01J 39/14

USPC ........................................................... 588/10
See application file for complete search history.

(56) References Cited

U.S. PATENT DOCUMENTS

| | | | | |
|---|---|---|---|---|
| 4,737,316 A | * | 4/1988 | Macedo | ................. C03C 1/002 423/21.5 |
| 5,242,503 A | * | 9/1993 | Grant | ....................... B09B 3/00 134/25.1 |
| 5,875,407 A | | 2/1999 | Pereira | |
| 2015/0315053 A1 | * | 11/2015 | Xie | .......................... G21F 9/06 210/663 |

FOREIGN PATENT DOCUMENTS

| | | |
|---|---|---|
| DE | 196 42 839 A1 | 4/1998 |
| WO | WO 2005/097368 A1 | 10/2005 |

OTHER PUBLICATIONS

International Search Report for PCT/US2018/012566.

* cited by examiner

*Primary Examiner* — Edward M Johnson
(74) *Attorney, Agent, or Firm* — Finnegan, Henderson, Farabow, Garrett & Dunner, LLP

(57) ABSTRACT

A method for treating a fluid waste, comprising adding one or more process additives to the fluid waste in an amount sufficient to change the wasteform chemistry is disclosed. The addition step may be chosen from adding a dispersant or a deflocculant an additive to decrease the reactive metal components, to bind fission products and decrease volatilization of toxic or radioactive elements or species during thermal treatment, or to target and react with the fine particle size component of the waste to decrease dusting and immobilize components in a durable phase. After mixing the fluid waste with the described additives the waste is eventually hot-isostatic pressing, to form a durable and stable waste form.

23 Claims, 3 Drawing Sheets

PROCESS FOR TREATING FLUID WASTES

This application claims the benefit of priority to U.S. Provisional Application No. 62/443,297, filed Jan. 6, 2017, which is incorporated herein by reference in its entirety.

TECHNICAL FIELD

The disclosed embodiments generally relate to a process for treating fluid wastes, such as those from spent nuclear fuel ponds, or other radioactive, hazardous, or toxic sludges, slurries, or liquid wastes. There is also disclosed a process to make a highly durable product from such wastes.

BACKGROUND

The current baseline method to treat radioactive sludges (such as Magnox Sludge), and turn the sludge into a solid wasteform, is to mix the sludge with a cement grout and cast it inside a container made from a steel, stainless steel, or iron. The cementation route increases the total waste volume. Typically, the cemented Magnox sludge is unstable as it contains reactive metal, which reacts with water in the sludge and cement mixture to produce hydrogen and so create an additional hazard. Furthermore, the metal and other phases in the sludge can also react to form expansive phases in the cement product, resulting in swelling of waste container during storage or after disposal. In addition, the durability of the cemented product, its resistance to the removal of radioisotopes by ground water or other means, is low compared to alternatives such as borosilicate glass or ceramics.

Despite the above-mentioned drawbacks, there are limited alternative processes in the public domain for the treatment of radioactive Magnox sludges. Much of these are related to dewatering and or using ion exchange systems to remove radioactive or toxic ions from the sludge liquid. The result is a more complicated outcome of having two or more waste stream outputs from the process. These products are then drummed or grouted in a broadly similar way to the cementation route discussed above. The possible scenario of a wasteform product from which toxic or radioactive components can be readily leached by water, as may occur from the intrusion of groundwater into a repository remains. Plus, as mentioned above the wasteform product when cemented or dewatered and packaged, will still contain reactive metal components, chemically bound water and some residual free water and hence will still generate hydrogen. Thus, complicating management of storage and requiring additional safety protocols.

Melting of the sludge with additives to form a glassy wasteform has also been proposed and this may be done either: (i) in situ in a melter box or other container using, e.g., electrodes or plasma methodology; or (ii) by melting in a melter, as is done for high level wastes, and pouring the glass into a canister or other receptacle. Glass forming additives or fluxes are typically added to assist melting. In the case of (ii) the glass must be sufficiently fluid to pour, which typically decreases the waste loading (hence increases the waste product volume) relative to the option here. Plus, there are limits on the amount of crystals in the glass as these can cause blockages in some glass melters.

Another issue with a melting process is that at the elevated temperatures required to melt the waste plus the additives mixture, the loss of volatile components such as radioactive cesium, ruthenium, technetium, etc. will occur. Hence, you end up with a radioactive secondary waste that contains a significant part of the radiological inventory. While some of this off-gas loss may be recycled, the volatilization increases the complexity and cost of the off-gas system for the treatment process.

In addition, if the sludge contains toxic metals such as mercury these will also create a secondary hazardous waste stream via volatilization. Typically melting routes require a higher temperature to achieve a dense uniform product than the invention disclosed here, further increasing the volatility of undesirable species/elements relative to the process disclosed here.

The processing of sludge wastes is also complicated by the rheology of many such sludges, which renders pumping difficult without high shear or dilution. Dilution makes the process less efficient and decreases the treatment plant throughput.

In view of the foregoing, there is a need for a process to treat radioactive sludge such that: (i) it becomes a stable, durable, solid wasteform suitable for long-term disposition; (ii) decreases the waste volume for storage and disposal compared to baseline methods; and (iii) increases the throughput and hence efficiency of the waste treatment plant.

To solve the many needs described above, and overcome the mentioned deficiencies, Applicants have developed the disclosed process, which differs from previous processes in that it uses a different combination and type of specific equipment and additives that assist the processing and product formation. This process disclosed offers a combination of methods to treat radioactive wastes that are sludges and in particular, Magnox Sludges, but may also be applied to liquid radioactive wastes that are mixed with additives.

SUMMARY

There is disclosed a method for treating a fluid waste, comprising adding one or more process additives to the fluid waste in an amount sufficient to change the wasteform chemistry. The disclosed method comprises at least one addition step chosen from adding one or more dispersant or a deflocculant to the waste to change the rheology of the fluid; one or more additives to decrease the reactive metal components; one or more special additives to bind fission products and decrease volatilization of toxic or radioactive elements or species during thermal treatment; and one or more additives to target and react with the fine particle size component of the waste to decrease dusting and immobilize components in a durable phase. After mixing the fluid waste with the described additives to form a slurry; additional process steps are described, including mixing, drying, calcining, blending and hot-isostatic pressing, also known as HIPing, to form a durable and stable waste form.

DETAILED DESCRIPTION OF THE DRAWING

Figure 1:
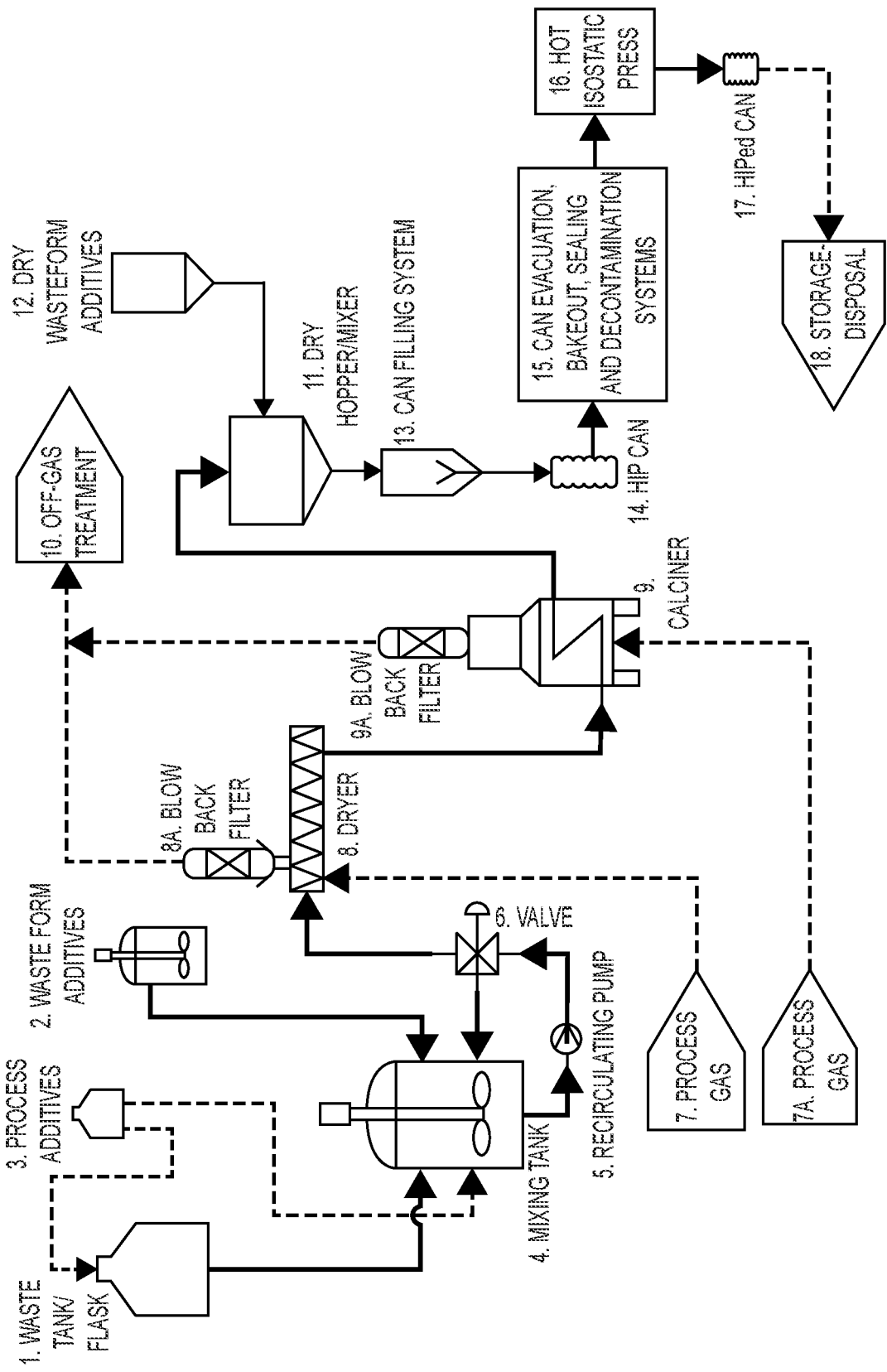
FIG. 1 is a schematic of a basic process according to the present disclosure.

It is to be understood that both the foregoing general description and the following detailed description are exemplary and explanatory only and are not restrictive of the invention, as claimed.

DETAILED DESCRIPTION OF THE INVENTION

The front-end processes for treating sludges as they currently exist consist of either (i) mixing waste plus additives in mixing tanks prior to drying, or, (ii) spraying waste onto an agitated bed of powder/granular additives with the aim of impregnating the granules with the waste and drying either at the same time or downstream. To avoid the problems associated with these processes, there is disclosed herein several options for treating the sludge waste including the utilization of process additives. In this embodiment, for example, the process comprises adding a dispersant/deflocculant to the sludge to change the rheology and decrease the amount of process water required.

Other beneficial options that overcome current process limitations that are disclosed herein include the addition of front end additives to decrease the reactive metal components, as well as the addition of additives to improve the product quality compared to merely drying or cementing.

In other embodiments there is disclosed the use of special additives to bind the fission products and decrease volatilization of toxic or radioactive elements or species during thermal treatment.

Other embodiments described herein focus on the addition of additives to target and react with the fine particle size component of the sludge decreasing dusting and immobilizing this component in a durable phase.

Still other embodiments describe alternative process including alternative options for thermal processing; and replacing the mixing step with an in-line mixer, such that the process footprint can be reduced, and the process simplified by the removal of pumps, mixers, etc., that can be difficult to maintain in radioactive environments.

As mentioned, current methods to treat wasteforms often lead to a wasteform product from which toxic or radioactive components can be readily leached by water, as may occur from the intrusion of groundwater into a repository. The waste product when cemented or dried will still contain reactive metal components, chemically bound and some residual free water and hence will still generate hydrogen. Thus, complicating management of storage and requiring additional safety protocols. To solve these problems, the disclosed process safely removes the hydrogen already present in such sludges, removes free and chemically bound water from the sludge and hence a source of future hydrogen generation, and reacts the reactive metal component so that it is no longer present in metal form. The product produced is a dense ceramic or glass-ceramic.

To be durable the waste product produced by melting has to be dense and free of open porosity. This requires the addition of glass forming additives and fluxes. These additives decrease the waste loading and for a melting route the volume of additives is much higher than the route disclosed here. Magnox Sludges once heated to decompose the magnesium hydroxide present form magnesium oxide (MgO) particles that are refractory and require even more additives to form a flowable melt of the desired viscosity to allow for pouring into a disposal container and consequently an even lower waste loading will result.

In one embodiment, a melt process will contain used melters as a secondary waste from route (ii). In route (i), the in-situ route, the waste product will also contain a much thicker melting pot or vessel, with the refractory walls, steel shell and electrodes. Plus, with the in-situ routes the volume of the waste will decrease by around 50% during the process as the voids in particulate waste plus additive mixture is removed and the glass forms and melts. The result is that the top of the container is now vacant, but that vacant volume still forms part of the final waste package. While this can be reduced by top filling as the melt settles the container may never be filled safely to the vessel brim. Furthermore, the present disclosure does not require the degree of melting required for these glass processes and hence the chemistry is designed and different, enabling higher density phases to be incorporated into the wasteform product. Hence, because of these factors, the actual volume of waste produced for storage and disposal is significantly larger from melting routes compared to the invention disclosed here. Waste volume equals an economic cost in terms of storage facility size, number of waste package shipments, repository size and even potentially the number of repositories required, and hence the route disclosed here offers the potential for significant cost savings over the life-cycle of the waste treatment process. For example, by using a modified process combined with an alternate wasteform chemistry and thermal treatment described herein, the final volume of the waste package can be reduced to ¹⁄₁₀th to ¹⁄₂₀th that of cementation.

The disclosed processes are further described and exemplified in the attached Figures. With reference to FIG. 1, the basic process is as follows. The sludge, slurry or liquid waste 1 arrives at the plant from a tank or in a flask or other vessel. It is pumped into a mixing tank 4. Processing additives 3 to change the rheology of the slurry such that it is suitable for pumping 5 via metering valve 6 to the dryer 8 can be added either to the waste tank or flask, or to the mixing tank 4. Additives 2, which can include water are added to the mixing tank 4 and the mixture is stirred to create a uniform slurry. The additives 2 can be added as one mixture or individual components from single or separate lines (only one line is shown on the drawing for simplicity). Included in the additives 2 can be an ion exchanger such as zeolite. Non-limiting examples of the type of zeolite that can be used includes clinoptilolite, $(Na,K,Ca)_{2\text{-}3}Al_3(Al,Si)_2Si_{13}O_{36} \cdot 12H_2O$ and mordenite, $(Ca,Na_2,K_2)Al_2Si_{10}O_{24} \cdot 7H_2O$. This ion exchanger serves to absorb free toxic or radioactive ions, such as cesium, from the waste liquor and bind them during the pre-hot isostatic pressing, thermal treatment stages (drying 8, and calcination 9).

A recirculating pump 5 feeds the mix to a valve that meters the feed to the dryer 8. The valve also serves to recirculate the slurry to the mixing tank 4. The dryer 8 is designed to dry the slurry to a free flowing, low dusting powder, suitable dryers include thin film evaporators (also called wiped film evaporators), pan dryers, spray dryers, flash dryers, fluidized bed dryers and rotary dryers, plus several other specialist industrial designs. Process gas 7 is used to sweep the moisture from the dryer to the off-gas system 10. The off-gas passes through a blowback filter/dust disentrainment system 8a that returns entrained dust back to the dryer.

Drying is typically undertaken at temperature ranging from 80-400° C., such as 100-350° C., and can be carried out at atmospheric pressures or under vacuum. Water condensed in the off-gas system 10 can be recirculated for reuse as an additive 2. After drying the sludge is calcined to remove residual water, chemically bound water, hydroxides, carbonates, sulphates, organic compounds and other salts. Process gas 7a is introduced to the calciner 9 to control the calcination conditions.

For radioactive waste streams reducing conditions are maintained so as to prevent the loss of radioactive volatile elements such as Cs, Ru and Tc. However, conditions can be varied to suit the specific waste streams, such as low oxygen to e.g., oxidize organics, neutral, or other atmospheres. Typical systems include $CO/CO_2$, $H_2$, $H_2$ in $N_2$, $H_2$ in Ar, Ar, $N_2$, air or lower partial pressure $O_2$ atmospheres. In addition to this, small quantities of acid can be injected into the process gas for either the drier 7 or calciner 7a. This acid can be either HCl, $HNO_3$, HF, $H_2SO_4$, $H_3PO_4$, or organic acids. These acids assist in breaking down carbonates and passivating residual metals. The calciner off-gas is treated through the off-gas system 10. The calciner is operated between 500 and 1100° C. depending upon the waste stream, with 500-800° C. being a typical range. The preferred type of calciner 9 is a vibratory calciner or a fluidized bed calciner, although rotary, flash, vertical screw feed, conveyor or other methods are feasible.

After calcination the powder is transferred to a mixer-hopper 11 where it is blended with additional process additives 12 if they are required for that waste. The process additives are (i) metal powders for redox control during hot-isostatic pressing (HIPing) 16, and (ii) wasteform additives that become part of the phases of the wasteform and ensure the wasteform has the correct, mineralogical composition. This mixer-hopper 11 can be a conical mixer, Phauler mixer, Forberg Mixer, ribbon blender, conical mixer, V-blender, or other type of proprietary or generic mixer.

After mixing the powder is fed into a can filling system 13, which meters the material into the HIP can 14. The HIP can is then evacuated, if necessary heated to remove any residual moisture (bakeout), hermetically sealed and decontaminated 16. The can 14 is loaded into the HIP machine where under a time-temperature-pressure cycle it undergoes compaction, densification and the wasteform phases form.

Typical process temperatures are 800-1400° C. and 10-300 MPa, for 10-16 hours depending upon the wasteform material. After HIPing the can 17 it is removed from the HIP. The can is then packaged 18 into a container suitable for transport to a disposal store. Alternatively, a store may be built into the design of a plant and the HIP can may be loaded either as is, or in an overpack, into the storage area.

The HIP process is generally described in more detail in U.S. Pat. No. 8,754,282, which is herein incorporated by reference in its entirety. More specifically, as described in this patent, the HIP consists of a pressure vessel surrounding an insulated resistance-heated furnace. Treating radioactive calcine with the HIP involves filling the container with the waste materials, here the contaminated ion exchange media. The container is evacuated and placed into the HIP furnace and the vessel is closed, heated, and pressurized. The pressure is typically provided via argon gas, which, at pressure, also is an efficient conductor of heat. The combination of heat and pressure consolidates and immobilizes the waste into a dense monolith.

The HIP will process one can at a time to a temperature, such as a temperature ranging from of about 800° C. to 1400° C., such as 1000° C. to 1300° C. at a processing pressure ranging from 10-300 MPa, such as 30-100 MPa. The cycle time to process a HIP can ranges from about 10-16 hours. Once removed from the HIP, the can will be allowed to cool to ambient temperature prior to being loaded into a disposal canister. The HIP temperature may also be modified depending on the waste. Various changes in HIP conditions such as temperatures, pressures, and atmospheres depending on the material being consolidated are discussed in U.S. Pat. Nos. 5,997,273 and 5,139,720, which are herein incorporated by reference.

In an alternative embodiment, there is described a process similar to above except that the mixer in the mixing tank includes a high shear mixer to which the additives are directly introduced to be intimately mixed with the waste.

Figure 2:
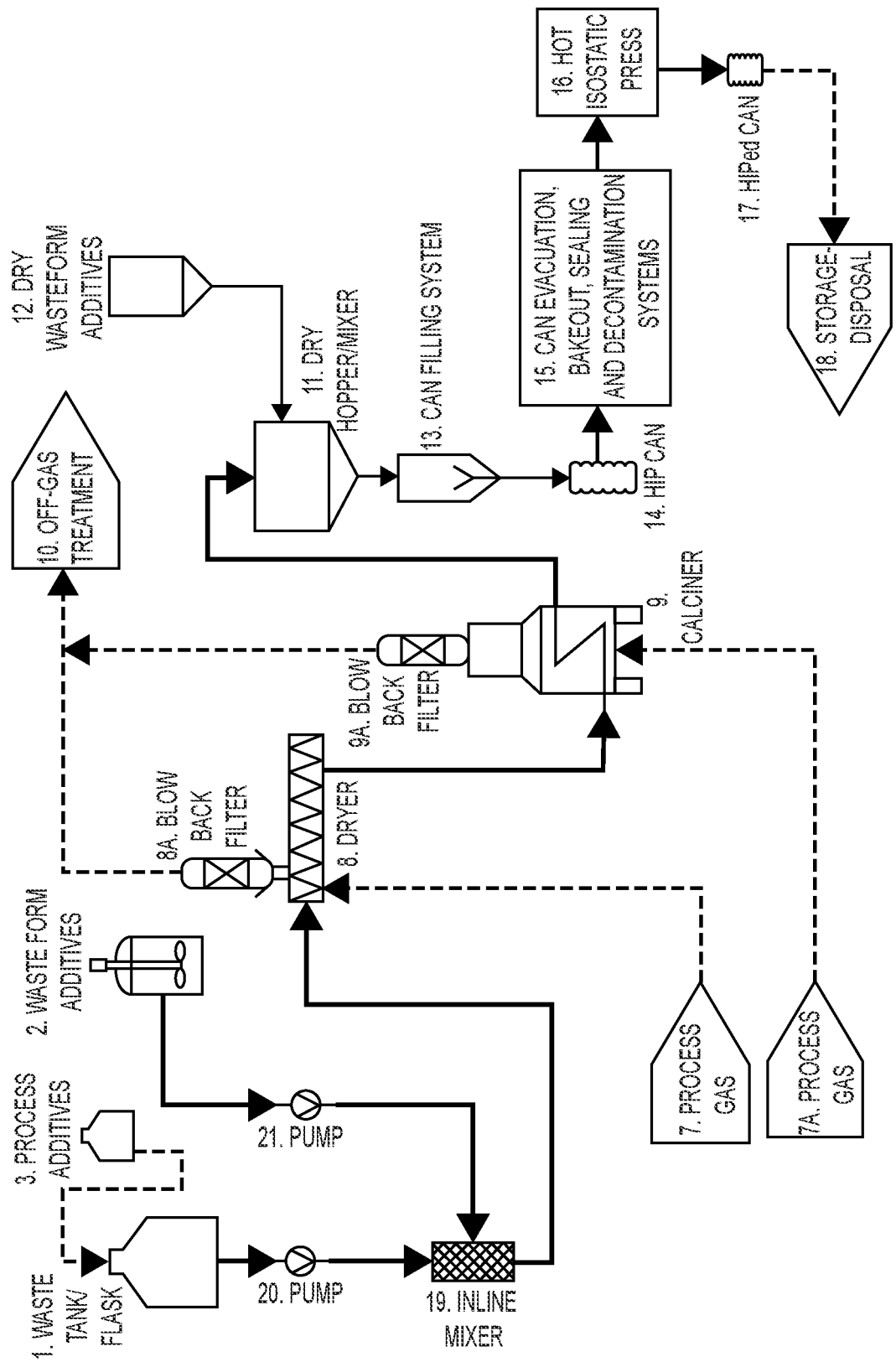
FIG. 2 is a schematic of a simplified process according to the present disclosure (and shown in FIG. 1) achieved by removing the mixing tank.

With reference to FIG. 2, there is described another embodiment, showing a simplified process from FIG. 1. This simplified process is achieved by removing the mixing tank and recirculating system and feeding both the waste tank contents 2 and any wasteform additives 2 directly into an in-line mixing system 19, using pumps 20 and 21, which is then fed directly to the dryer 8. There may be a valve (not shown) prior to the dryer to further control the feed rate to the dryer. The in-line mixer 19 can be a static mixer, or a specialist slurry mixer, or dynamic, high shear, in-line mixers. This process option reduces the hot-cell volume and simplifies the process. Furthermore, by using high shear in-line mixers, or in line agitators (not shown) the particle size of the incoming slurry can be reduced, if required, before it is fed to the dryer assisting downstream reactivity and reducing the potential for blockages. This could be beneficial to Magnox and other fuel pond sludges. The backend of the process is the same as FIG. 1. As an alternative process and/or wasteform additives can be added directly to the mixer (not shown in FIG. 2)

Figure 3:
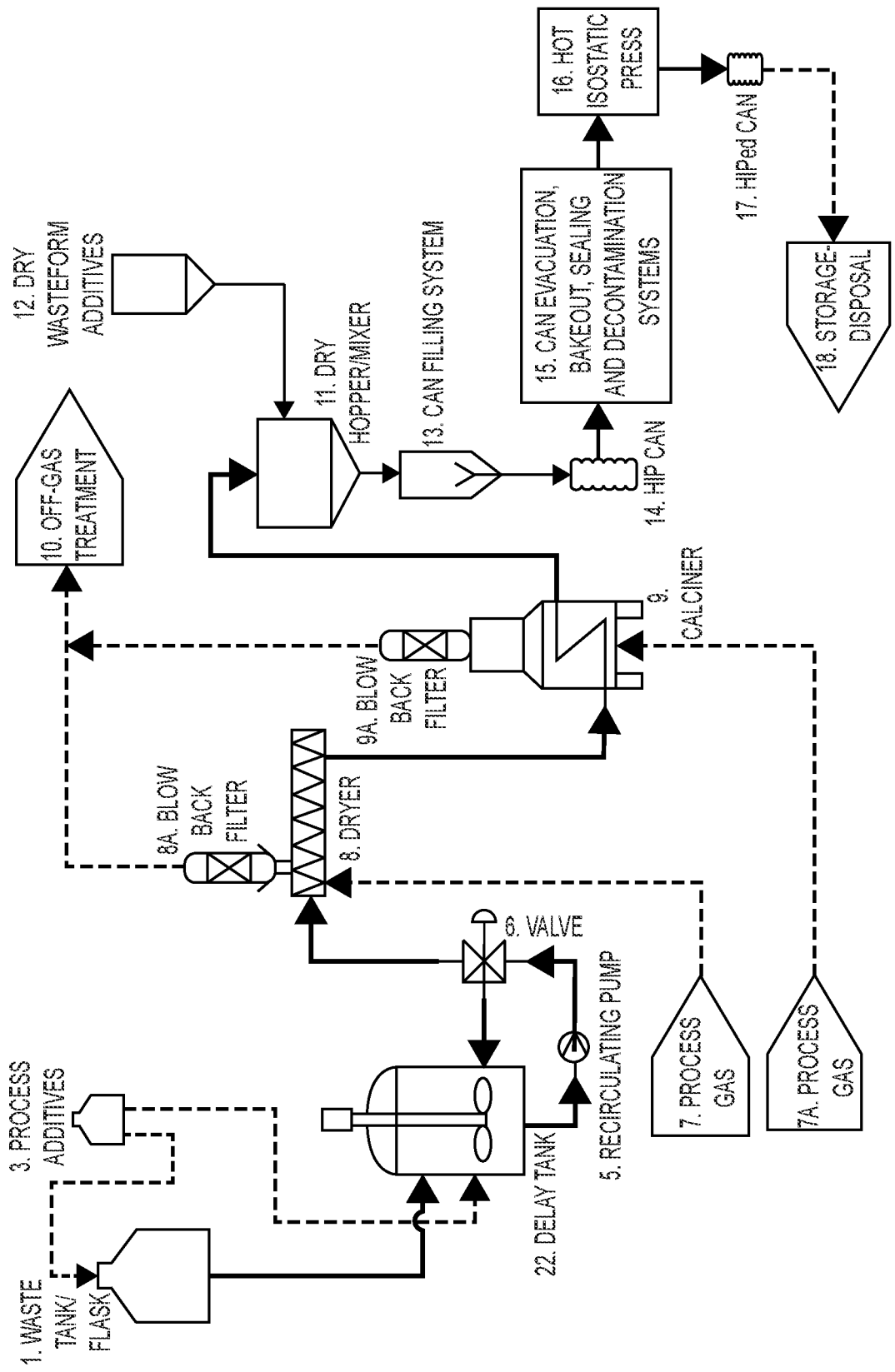
FIG. 3 is a schematic of a basic process according to the present disclosure in which the wet mixing front end shown in FIG. 1 is replaced by a delay tank.

With reference to FIG. 3, there is shown another embodiment in which the wet mixing front end (4 in FIG. 1) is replaced by a delay tank 22. This tank meters the sludge waste into the dryer 8. In this process, all the wasteform additives are introduced at the back-end of the process just prior to HPPing in mixer 24 or just prior to calcination mixer 23. The mixer can be a variety of standard types including, ribbon, phauler, Forberg, paddle, vertical screw conical, or other proprietary mixers. While cone or twin cone blenders, V-benders or other batch mixers could be used, the detaching required from the line in order for them to operate increases the risk of spillage and contamination.

In an additional embodiment, there is described another process option, which is to combine the dryer and calciner into one unit. This could be a fluidized bed calciner-dryer, a flash calciner process, a slurry fed rotary calciner or other device. While the two-stage approach gives better product quality control, some may be attracted by the apparent simplicity of a single-stage process.

Other embodiments of the invention will be apparent to those skilled in the art from consideration of the specification and practice of the invention disclosed herein. It is intended that the specification and examples be considered as exemplary only, with the true scope of the invention being indicated by the following claims.

What is claimed is:

1. A method for treating a fluid waste, comprising adding one or more process additives to the fluid waste in an amount sufficient to change the wasteform chemistry, wherein the fluid waste comprises a spent fuel pond sludge, a radioactive sludge, or other toxic sludges or slurries, said method comprising:

one or more of the following addition steps:
adding one or more dispersant or a deflocculant to the waste to change the rheology of the fluid;
adding one or more additives to decrease the reactive metal components;
adding one or more special additives to bind fission products and decrease volatilization of toxic or radioactive elements or species during thermal treatment; and
wherein when the fluid waste comprises particles the method may comprise adding one or more additives to target and react with the particles to decrease dusting and immobilize components in a durable phase, the method further comprising mixing the fluid waste to form a slurry, drying the slurry to form a free flowing powder, and calcining the free flowing powder, wherein either the drying or calcining step is performed in the presence of a process gas that has been injected with an acid.

2. The method of claim 1, wherein the special additives to bind fission products comprises an ion exchanger.

3. The method of claim 2, wherein the ion exchanger comprises a zeolite that absorbs free toxic or radioactive ions from the waste liquor and bind them during subsequent thermal processing steps chosen from pre-hot isostatic pressing, drying and calcination.

4. The method of claim 3, wherein the zeolite is chosen from clinoptilolite, $(Na,K,Ca)_{2-3}Al_3(Al,Si)_2Si_{13}O_{36}\cdot 12H_2O$, mordenite, $(Ca,Na_2,K_2)Al_2Si_{10}O_{24}\cdot 7H_2O$, and combinations thereof.

5. The method of claim 2, wherein the fission products comprise Cs, Ru and Tc.

6. The method of claim 1, wherein the drying step is performed by at least one dryer selected from a thin film evaporator, a pan dryer, a spray dryer, a flash dryer, a fluidized bed dryer and a rotary dryer.

7. The method of claim 1, wherein the drying step is performed at a temperature ranging from 100-350° C.

8. The method of claim 1, wherein the free-flowing powder is calcined in a calciner to remove one or more of the following: residual water, chemically bound water, hydroxides, carbonates, sulphates, organics and other salts.

9. The method of claim 1, wherein a process gas is chosen to achieve a reducing atmosphere when the waste material includes radioactive elements, so as to prevent the loss of radioactive volatile elements.

10. The method of claim 1, wherein the process gas comprises $CO/CO_2$, $H_2$, $H_2$ in $N_2$, $H_2$ in Ar, Ar, $N_2$, air or lower partial pressure $O_2$ atmospheres.

11. The method of claim 1, wherein the acid is chosen from HCl, $HNO_3$, HF, $H_2SO_4$, $H_3PO_4$, or organic acids.

12. The method of claim 1, wherein the acids are added in an amount sufficient to help break down carbonates and passivate residual metals.

13. The method of claim 8, wherein calcining occurs at a temperature ranging from 500 to 1100° C.

14. The method of claim 8, wherein calcining occurs at a temperature ranging from 500 to 800° C.

15. The method of claim 8, wherein the calciner is chosen from a vibratory, fluidized bed, a rotary, flash, vertical screw feed or conveyor.

16. The method of claim 8, wherein after calcination the powder is transferred to a mixer-hopper where it is blended with additional process additives.

17. The method of claim 16, wherein the process additives comprise (i) metal powders for redox control during hot-isostatic pressing (HIPing), and (ii) wasteform additives that become part of the phases of the wasteform and ensure the wasteform has the correct, mineralogical composition.

18. The method of claim 16, wherein the mixer-hopper is chosen from a conical mixer, Phauler mixer, Forberg Mixer, ribbon blender, tumbling mixer, or a Vblender.

19. The method of claim 16, wherein after mixing, the powder is fed into a can filling system which transfers the material into a HIP can.

20. The method of claim 19, further comprising performing at least one step on the HIP Can, chosen from evacuation, heating to remove any residual moisture, hermetically sealing, and decontamination, prior to loading it into the HIP machine.

21. The method of claim 20, where the HIP can undergoes compaction and densification, at process temperatures ranging from 800 to 1400° C. and pressures ranging from 10-300 MPa.

22. The method of claim 1, wherein the fluid waste comprises magnesium, plutonium, aluminum, graphite, uranium, and other nuclear power plant decommissioning wastes, zeolitic materials, and contaminated soils.

23. The method of claim 22, wherein the zeolitic materials comprise clinoptilolite, $(Na,K,Ca)_{2-3}Al_3(Al,Si)_2Si_{13}O_{36}\cdot 12H_2O$, mordenite, $(Ca,Na_2,K_2)Al_2Si_{10}O_{24}\cdot 7H_2O$, and combinations thereof.

* * * * *